United States Patent [19]

Miyahara et al.

[11] 4,335,746
[45] Jun. 22, 1982

[54] LIQUID STORAGE TANK

[75] Inventors: Akimitsu Miyahara, Tokyo;
Toshihiko Kanazawa, Sagamihara;
Kokaji Takahashi, Fujisawa; Hiroji
Ushikubo, Ageo; Kuniaki Kawano,
Matsudo, all of Japan

[73] Assignee: Japan Organo Company, Ltd.,
Tokyo, Japan

[21] Appl. No.: 189,302

[22] Filed: Sep. 22, 1980

[51] Int. Cl.³ .............................................. E03B 11/00
[52] U.S. Cl. ...................................................... 137/576
[58] Field of Search ................. 137/573, 574, 575, 576

[56] References Cited

U.S. PATENT DOCUMENTS

| 1,307,609 | 6/1919 | Yarnall | 137/575 X |
| 2,311,862 | 2/1943 | Palmquist | 137/573 |
| 2,316,729 | 4/1943 | Tryon | 137/573 X |
| 2,704,206 | 3/1955 | Crook | 137/575 X |

FOREIGN PATENT DOCUMENTS

| 45-24807 | 8/1970 | Japan . |
| 46-5782 | 10/1971 | Japan . |
| 51-101140 | 11/1976 | Japan . |
| 53-88335 | 9/1978 | Japan . |
| 53-26336 | 10/1978 | Japan . |
| 1083500 | 7/1964 | United Kingdom . |

Primary Examiner—William R. Cline
Attorney, Agent, or Firm—Armstrong, Nikaido, Marmelstein & Kubovcik

[57] ABSTRACT

A liquid storage chamber having a plurality of stages formed by horizontal partition plates which divide the space in the tank into a plurality of storage chambers. The partition plates have openings at their alternating ends so that the liquid supplied to the tank can flow down through the successive liquid storage chamber in a serpentine manner. The liquid storage chamber further has an opening flow setting plate having a multiplicity of liquid passage ports and disposed in each opening for making the liquid flow laminar through each opening and a storage chamber flow setting plate having a multiplicity of flow passage ports and disposed in each liquid storage chamber for making the liquid flowing horizontally in each liquid storage chamber flow in the form of a laminar flow. Consequently, liquids introduced into the tank exhibiting a chromatographic concentration distribution are stored in such a manner as to avoid the mixing of liquids of different components and concentrations due to stirring and convection, in the order of introduction to the tank, and are discharged in the same order as the introduction to the tank.

5 Claims, 1 Drawing Figure

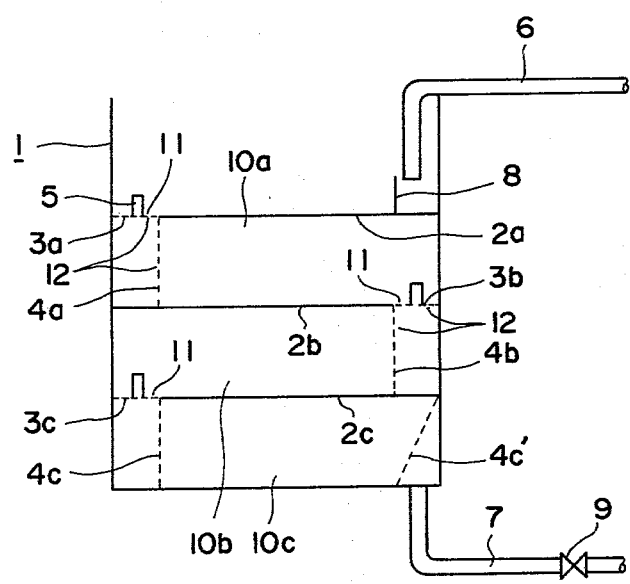

LIQUID STORAGE TANK

BACKGROUND OF THE INVENTION

1. Field of the Invention

The present invention relates to a liquid storage tank having a multiplicity of stages of partition plates incorporating laminar flow setting plates arranged in an appropriate manner. More particularly, the invention is concerned with a liquid storage tank adapted for use in a system having an adsorbing tower through which a mixture liquid having a plurality of components is circulated. The liquid flows out of the adsorbing tower with each component exhibiting a chromatographic concentration distribution. The components are repeatedly circulated through the adsorbing tower in the order or sequence of the flowing out, so that the multiplicity of components are further separated from one another.

The invention aims at providing a liquid storage tank of the kind described for receiving liquid flowing from such a tower exhibiting a chromatographic concentration distribution in the order or sequence of the flowing in such a manner as to avoid the mixing of liquids of different contents and concentrations due to stirring or convection. The tank also permits discharging the liquid in the order of the concentration of the components.

DESCRIPTION OF THE PRIOR ART

In the conventional liquid storage tank of the kind described, the space in the tank is divided into a plurality of storage chambers by means of a plurality of stages of horizontal partition plates. These partition plates are provided at their alternating sides in a staggered manner with openings for allowing the liquid to flow down therethrough, such that, when the partition plate of the uppermost stage has an opening at its one side, the partition plate of the next stage is provided with its opening at the opposite side. The liquid is introduced into the tank from the upper side thereof, and is made to flow down through the chambers successively to fill the chambers from the lower-most one upwards. After a stay for a predetermined period, the liquid is discharged from the lower end of the tank.

In this type of liquid storage tank, it is possible to fill the tank with the liquids from the bottom in the order of flow into the tank and to store the liquids while avoiding the mixing of the liquids due to stirring and convection by means of the partition plates. However, as the liquids are extracted from the bottom of the tank, a non-uniform flow takes place in each chamber defined by the partition plates such that the lower part of the liquid flows faster than the upper part of the liquid in each chamber. In consequence, the liquid which has been stored in the upper part of the tank flows down outpacing the upper part of the liquid which was stored in each of the underlying chambers. For this reason, it is not possible to discharge the liquids in the order in which the liquids have been introduced into the tank.

SUMMARY OF THE INVENTION

The present invention aims at obviating the above-described shortcoming of the prior art.

To this end, according to the invention, there is provided a liquid storage tank having a multiplicity of horizontal partition plates dividing the space in the tank into a plurality of storage chambers, the partition plates having at alternating or staggered sides openings for allowing the liquids to flow therethrough, in such a manner that the partition plate of the uppermost stage has its opening at one side and the partition plate of the second stage has its opening at the opposite side, characterized by comprising a plurality of opening flow setting plates having a plurality of liquid passage apertures and disposed at each of the openings, and a plurality of storage chamber flow setting plates having a plurality of liquid passage ports and disposed at any desired portion of each of the liquid storage chambers.

BRIEF DESCRIPTION OF THE DRAWINGS

The attached sole FIGURE is a longitudinal sectional view of a liquid storage tank constructed in accordance with an embodiment of the invention.

DESCRIPTION OF THE PREFERRED EMBODIMENTS

The invention will be described hereinunder with reference to the accompanying drawing. A liquid storage tank 1 has a multiplicity of stages of horizontal partition plates 2 disposed at a suitable pitch in the tank 1 so as to divide the space in the tank 1 into a multiplicity of storage chambers 10. The partition plates are provided at their alternating ends with openings 11 for allowing the liquids to flow down therethrough, in such a staggered manner that the partition plate 2a of the uppermost stage has its opening 11 at one end thereof, while the partition plate 2b of the second stage has its opening at its other end. Subsequent partition plates starting from the third one 2c have their openings 11 in the same staggered manner. Each opening 11 is provided with an opening flow setting plate 3, while each liquid storage chamber 10 defined by the partition plates 2 is provided at any desired portion thereof with a storage chamber flow setting plate 4. Each of the flow setting plates 3 and 4 are provided with liquid passage ports 12 such as apertures shaped as slits or as any other desired shape which permits the liquid to flow therethrough while setting the flow of the liquid, i.e. generating laminar flow of the liquid. The total area of the liquid passage ports preferably occupies about 5 to 20% of the total area of the flow setting plate 3 or 4. The storage chamber flow setting plates may be provided in single or plural form at one or more portions of each storage chamber in a vertical or an inclined posture. It is, however, preferred that at least one storage chamber flow setting plate 4 is disposed just beneath the juncture between the partition plate 2 and the opening flow setting plate 3 as in the illustrated embodiment. This is because, by so doing, a remarkable flow setting effect is obtained. A reference numeral 5 denotes an air purge valve provided to open at any desired portion of each partition plate 2 or the opening flow setting plate 3. The air purge pipe 5 has a height which preferably is not greater than 50% of the storage chamber 10.

A reference numeral 6 denotes a liquid inlet pipe, while a liquid outlet pipe having a valve 9 is designated at a reference numeral 7. An overflow dam 8 is provided at the liquid inlet side of the liquid storage tank 1.

The liquid storage tank 1 of the invention operates in a manner explained hereinunder. The valve 9 of the outlet pipe 7 is closed, and the multi-component liquid flowing with a chromatographic concentration distribution is made to flow into the liquid storage tank 1 through the inlet pipe 6. As a result, the liquid overflows the overflow dam 8 and flows down successively through the storage chambers 10a, 10b, 10c. In the course of this flow of the liquid, the flow is set in the state of laminar flow because the liquid passes through the opening flow setting plates 3a, 3b, 3c and the storage chamber flow setting plates 4a, 4b, 4c, 4c' so as to fill up the lowermost storage chamber 10c and then the upper chambers 10b and 10a successively. The flowing velocity of the liquid coming into the tank 1 is preferably selected to fall between about 0.2 and 2 cm/sec in relation to the cross-section of the storage chamber 10. The air in the tank is displaced by the liquid and discharged to the outside of the tank 1 through the air purge pipe 5, so that each chamber 10 can be smoothly filled up.

In the liquid storage tank of the invention, since the space in the tank 1 is divided into a plurality of storage chambers 10 by the partition plates 2 and since the opening flow setting plates 3 and the storage chamber setting plates 4 are provided, it is possible to store the liquids of different contents and concentrations in respective chambers 10, without permitting the mixing of these liquids due to stirring action caused by the flow of liquid and convection.

The conventional storage tank having only the partition plate cannot prevent the mixing of the liquid due to diffusion. However, according to the invention, the rate of mixing due to diffusion of liquid is minimized because of the provision of the opening flow setting plates 3 and the storage chamber flow setting plate 4.

The supply of liquid from the inlet pipe 6 is stopped after the liquid storage tank 1 is filled with a predetermined amount of liquid. Then, the valve 9 of the outlet pipe 7 is opened to allow the liquid to be discharged from the liquid storage tank 1. During the discharge of the liquid, the liquid flowing down through the opening 11 takes the form of laminar flow because it flows through the opening flow setting plate 3. Also, the horizontal flow of liquid in each chamber 10 is made to take the form of laminar flow as it flows through the storage chamber flow setting plate 4. In consequence, the liquid flows uniformly in each liquid storage chamber 10 and the liquids are discharged in order such that the liquid which has stayed in the lowermost chamber is discharged first and then the liquids in the overlying chambers are successively discharged, i.e. in the order of concentration distribution of the multi-component liquid which has flown into the liquid storage tank 1. It is preferred that the velocity of the liquid discharged from the tank 1 is selected to be 0.2 to 2 cm/sec. in relation to the cross-section of the storage chamber 10, as in the case of velocity flowing into the tank 1.

As has been described, according to the invention, the liquids flowing into the liquid storage tank while exhibiting a chromatographic concentration distribution are accumulated in the tank in such a manner as to fill the lowermost chamber first and then the overlying chambers successively, without permitting the mixing of liquids of different components and concentrations, because of the flow setting action of the opening flow setting plates and storage chamber flow setting plates which have liquid passage ports such as a multiplicity of openings or slits. At the same time, it is possible to discharge the liquids in the same order of components and concentrations as that of the liquids flowing into the tank. In the conventional liquid storage tank of the kind described having no flow setting plate, a highly complicated and difficult operation is required for controlling the velocities of the liquids flowing into and out of the tank. Such a problem, however, is completely overcome in the liquid storage tank of the invention, because of provision of the opening flow setting plates and storage chamber flow setting plates.

According to the invention, it is possible to form a multiplicity of storage chambers in the tank, so that the number of the tanks is reduced to save the installation area and to lower the investment cost, as compared with the conventional system which employs a multiplicity of liquid storage tanks of comparatively small capacity and adapted to share the liquid to be stored.

What is claimed is:

1. In a liquid storage tank having a multiplicity of stages of horizontal partition plates which divide the space in said tank into a plurality of storage chambers, said partition plates having openings for allowing a liquid to flow down therethrough from the overlying chamber to the underlying chamber, said openings being arranged in a staggered manner such that the opening of the overlying partition plate is formed at one end of said tank while the opening of the underlying partition plate is formed at the other end of said tank;

an improvement which comprises means for generating laminar flow between chambers comprising a plate provided at each of said openings and having a multiplicity of liquid passage ports; and storage chamber means for generating laminar flow across chambers comprising a flow setting plate vertically provided in each of said liquid storage chambers and having a multiplicity of liquid passage ports.

2. A liquid storage tank as claimed in claim 1 wherein at least one storage chamber means is disposed in said liquid storage chamber, one of said flow setting plates being disposed just beneath said juncture between said partition plate and said means between chambers.

3. A liquid storage tank as claimed in claim 1 or 2, wherein the velocity of said liquid flowing into said tank and the velocity of said liquid flowing out of said tank are selected to fall within the range of between 0.2 and 2 cm/sec in relation to the cross-section of said storage chamber.

4. A liquid storage tank as claimed in any one of claims 1 or 2 wherein the total area of said liquid passage ports of each plate is about 5 to 20% of each plate.

5. A liquid storage tank as claimed in claim 3 wherein the total area of said liquid passage ports of each plate is about 5 to 20% of each plate.

* * * * *